US012463777B2

(12) United States Patent
Su

(10) Patent No.: US 12,463,777 B2
(45) Date of Patent: Nov. 4, 2025

(54) UPLINK TRANSMISSION RESOURCE INDICATION METHOD AND APPARATUS

(71) Applicant: HUAWEI TECHNOLOGIES CO., LTD., GuangDong (CN)

(72) Inventor: Liyan Su, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 428 days.

(21) Appl. No.: 17/993,445

(22) Filed: Nov. 23, 2022

(65) Prior Publication Data

US 2023/0171066 A1 Jun. 1, 2023

Related U.S. Application Data

(63) Continuation of application No. PCT/CN2021/088452, filed on Apr. 20, 2021.

(30) Foreign Application Priority Data

May 25, 2020 (CN) .......................... 202010451719.2

(51) Int. Cl.
*H04L 5/00* (2006.01)
*H04W 72/0446* (2023.01)
(Continued)

(52) U.S. Cl.
CPC ....... *H04L 5/0051* (2013.01); *H04W 72/0446* (2013.01); *H04W 72/0453* (2013.01); *H04W 72/02* (2013.01)

(58) Field of Classification Search
CPC ..... H04L 5/003; H04L 5/0048; H04L 5/0051; H04L 2012/5674; H04W 72/04;
(Continued)

(56) References Cited

U.S. PATENT DOCUMENTS 9,019,913 B2 * 4/2015 Madan ................. H04L 5/0094
370/329
10,574,377 B2 * 2/2020 Zhang ................. H04W 48/12
(Continued)

FOREIGN PATENT DOCUMENTS

CN 102427396 * 4/2012 ............... H04L 1/00
CN 103209493 A 7/2013
(Continued)

OTHER PUBLICATIONS

3GPP TS 38.211 V16.1.0 (Mar. 2020), 3rd Generation Partnership Project; Technical Specification Group Radio Access Network; NR; Physical channels and modulation (Release 16); 130 total pages.

*Primary Examiner* — Warner Wong
(74) *Attorney, Agent, or Firm* — Rimon PC

(57) ABSTRACT

This application provides an uplink transmission resource indication method and an apparatus. The method is applied to a first network device and includes: determining a first RS resource of a second network device in a time-frequency resource, where the time-frequency resource includes a plurality of time units in time domain, the first RS resource is located in a first time unit in time domain, and the plurality of time units include the first time unit; and sending first configuration information to UE, where the first configuration information is for determining an uplink transmission resource in the time-frequency resource, and the uplink transmission resource does not overlap the first RS resource.

20 Claims, 8 Drawing Sheets

(51) Int. Cl.
*H04W 72/0453* (2023.01)
*H04W 72/02* (2009.01)

(58) Field of Classification Search
CPC ........... H04W 72/0453; H04W 72/044; H04W 72/0446; H04W 28/16; H04W 72/02; H04W 72/50; H04W 56/00; H04W 56/001
See application file for complete search history.

(56) References Cited

U.S. PATENT DOCUMENTS

| | | | | |
|---|---|---|---|---|
| 2010/0142466 | A1* | 6/2010 | Palanki | H04L 5/0091 370/329 |
| 2014/0036737 | A1* | 2/2014 | Ekpenyong | H04L 5/0035 370/328 |
| 2014/0098720 | A1* | 4/2014 | Zeng | H04W 72/20 370/280 |
| 2017/0070924 | A1* | 3/2017 | Wu | H04W 36/249 |
| 2017/0295563 | A1* | 10/2017 | Ma | H04W 72/04 |
| 2020/0092859 | A1* | 3/2020 | Dinan | H04W 72/23 |

FOREIGN PATENT DOCUMENTS

| | | | | |
|---|---|---|---|---|
| CN | 104244262 | A | 12/2014 | |
| CN | 108173633 | A | 6/2018 | |
| CN | 109150387 | A | 1/2019 | |
| WO | WO-2014121442 | A1 * | 8/2014 | ........... H04L 5/0094 |
| WO | 2020091639 | A1 | 5/2020 | |

* cited by examiner

UPLINK TRANSMISSION RESOURCE INDICATION METHOD AND APPARATUS

CROSS-REFERENCE TO RELATED APPLICATIONS

This application is a continuation of International Application No. PCT/CN2021/088452, filed on Apr. 20, 2021, which claims priority to Chinese Patent Application No. 202010451719.2, filed on May 25, 2020. The disclosures of the aforementioned applications are hereby incorporated by reference in their entireties.

TECHNICAL FIELD

This application relates to the field of communication technologies, and in particular, to an uplink transmission resource indication method and an apparatus.

BACKGROUND

In a wireless communication system, communication may be classified into different types based on different types of sending nodes and receiving nodes. Generally, sending information by a network device (for example, a base station) to user equipment (UE) is referred to as downlink (DL) communication, and sending information by UE to a network device is referred to as uplink (UL) communication. Resources used for uplink communication and downlink communication may be divided into a plurality of radio frames in a time domain, each radio frame may include a plurality of slots, and each slot may include a plurality of symbols. A ratio of a quantity of uplink symbols to a quantity of downlink symbols in one slot may be referred to as an uplink-downlink configuration of the slot. The uplink symbol may be a symbol used for uplink communication, and the downlink symbol may be a symbol used for downlink communication. When most symbols in one slot are uplink symbols, the slot may be referred to as an uplink slot. When most symbols in one slot are downlink symbols, the slot may be referred to as a downlink slot. The network device may implement time division multiplexing (TDD) by configuring the uplink slot and the downlink slot on a same frequency domain resource.

Currently, for a TDD communication system including a macro base station, a micro base station, and micro UE (namely, UE that accesses the micro base station), the macro base station generally sends downlink information such as a channel state information (CSI)-reference signal (RS) to macro UE by using a downlink slot, and the micro UE generally sends uplink information such as uplink data to the micro base station by using an uplink slot. When the downlink slot used by the macro base station and the uplink slot used by the micro UE are a same slot, the slot may be referred to as a slot with a different configuration. When the micro base station receives both the CSI-RS and the uplink data in the slot with a different configuration, the CSI-RS causes interference to the uplink data.

In the conventional technology, a mini-slot-based solution is proposed. To be specific, a CSI-RS sent by a macro base station and uplink data sent by micro UE are carried in different mini-slots, and a quantity of symbols included in the mini-slot is less than a quantity of symbols included in a common slot. For example, the common slot includes 14 symbols that are respectively represented as symbols 0 to 13. If the macro base station sends the CSI-RS on the symbols 5 to 8 in the slot, the micro UE separately sends the uplink data on the symbols 0 to 4 and the symbols 9 to 13 in the slot. That is, the symbols 0 to 4, the symbols 5 to 8, and the symbols 9 to 13 are separately used as a mini-slot.

However, the foregoing solution has the following disadvantages: 1. The CSI-RS generally does not occupy all frequency domain resources on the symbols 5 to 8. Therefore, there is a resource waste problem. 2. A demodulation reference signal (DMRS) needs to be sent in each mini-slot used to send the uplink data. Consequently, a quantity of resources used to transmit the uplink data is decreased. 3. The uplink data is split into a plurality of small data packets for transmission in different mini-slots, and each small data packet needs to be independently encoded. Consequently, a coding gain loss is caused.

SUMMARY

This application provides an uplink transmission resource indication method and an apparatus, to resolve a problem of wasted uplink transmission resources in the conventional technology. In addition, this solution may further effectively avoid a case in which, when some nodes in a heterogeneous network receive both downlink transmission of a network device and uplink transmission of UE, a downlink CSI-RS collides with a DMRS of uplink data.

To achieve the foregoing objective, the following technical solutions are used in embodiments of this application.

According to a first aspect, an uplink transmission resource indication method is provided, and applied to a first network device. The first network device may be a micro base station, and the method includes: determining a first reference signal RS resource of a second network device in a time-frequency resource (where for example, an RS may be a CSI-RS, the second network device may be a macro base station, and the first RS resource may be a resource used to transmit the RS), where the time-frequency resource includes a plurality of time units in the time domain, each time unit may be a slot, the first RS resource is located in a first time unit in the time domain, and the plurality of time units include the first time unit; and sending first configuration information to user equipment, where the first configuration information is for determining an uplink transmission resource in the time-frequency resource. For example, the first configuration information may indicate the first RS resource or indicate the uplink transmission resource. The uplink transmission resource may be a resource used to transmit uplink information, and the uplink transmission resource does not overlap the first RS resource.

In the foregoing technical solution, the first network device may send the first configuration information to the user equipment, to indicate the first RS resource of the second network device or indicate the uplink transmission resource by using the first configuration information. The first RS resource or the uplink transmission resource may use an RE as a granularity, so that the user equipment can transmit the uplink information in a slot in which the RS of the second network device is located, and the problem of wasted uplink transmission resources can be avoided.

In a possible implementation of the first aspect, the method further includes: sending second configuration information to the user equipment, where the second configuration information indicates a first location offset, and the first location offset is a location offset of an uplink demodulation reference signal DMRS. In this way, the user equipment may determine a time domain symbol location of the uplink DMRS in the uplink transmission resource based on the second configuration information. In the foregoing possible implementation, the first network device may indicate the first location offset by using the second configuration information, so that the user equipment can determine the time domain symbol location of the uplink DMRS in the uplink transmission resource based on the first location offset, and a collision between the uplink DMRS and a downlink CSI-RS can be effectively avoided.

In a possible implementation of the first aspect, a time domain symbol occupied by the uplink DMRS after the uplink DMRS is shifted by the first location offset is different from a time domain symbol occupied by the first RS resource. In the foregoing possible implementation, location shifting is performed on the uplink DMRS in a slot in which there is a CSI-RS, so that a problem of collision between the CSI-RS and the uplink DMRS can be effectively avoided.

In a possible implementation of the first aspect, the method further includes: receiving an RS from the second network device on the first RS resource, and receiving uplink information from the user equipment on the uplink transmission resource, where the uplink information includes uplink data and the uplink DMRS. In the foregoing possible implementation, interference from the uplink information of the first network device can be avoided when the first network device receives the RS (for example, the CSI-RS) delivered by the second network device.

In a possible implementation of the first aspect, the time-frequency resource includes a plurality of RS resources of the second network device, and the first RS resource is a subset of the plurality of RS resources. In the foregoing possible implementation, complexity of measuring interference of the RS of the second network device by the first network device can be reduced.

In a possible implementation of the first aspect, the first configuration information indicates the first RS resource; or the first configuration information indicates the uplink transmission resource. In the foregoing possible implementation, the first network device may indicate the first RS resource of the second network device or indicate the uplink transmission resource by using the first configuration information. The first RS resource or the uplink transmission resource may use an RE as a granularity, so that resource utilization can be improved, and wasted resources can be avoided.

In a possible implementation of the first aspect, the first configuration information and/or the second configuration information are/is carried in higher layer signaling. In this way, physical layer transmission resources can be saved. Because interference measurement is generally a long-term or periodic operation, interference measurement does not need to be dynamically scheduled. Optionally, the higher layer signaling is RRC signaling. The RRC signaling is UE-specific signaling. In this way, an amount of to-be-transmitted data can be reduced, and transmission reliability of the first configuration information can be ensured. Alternatively, the RRC signaling is cell-specific signaling. In this way, transmission resources can be saved, and transmission reliability of the first configuration information can be improved.

According to a second aspect, an uplink transmission resource indication method is provided, and applied to user equipment. The method includes: receiving first configuration information from a first network device, where the first configuration information is for determining an uplink transmission resource in a time-frequency resource, and the uplink transmission resource may be a resource used to transmit uplink information; and determining the uplink transmission resource based on the first configuration information, where the uplink transmission resource does not overlap a first reference signal RS resource of a second network device in the time-frequency resource (where for example, an RS may be a CSI-RS, the second network device may be a macro base station, and the first RS resource may be a resource used to transmit the RS), the time-frequency resource includes a plurality of time units in time domain, the first RS resource is located in a first time unit in the time domain, each time unit may be a slot, and the plurality of time units include the first time unit.

In the foregoing technical solution, the user equipment may receive the first configuration information from the first network device, and determine the first RS resource of the second network device or the uplink transmission resource by using the first configuration information. The first RS resource or the uplink transmission resource may use an RE as a granularity, so that the user equipment can transmit the uplink information in a slot in which the RS of the second network device is located, and a problem of wasted uplink transmission resources can be avoided.

In a possible implementation of the second aspect, the method further includes: receiving second configuration information from the first network device, where the second configuration information indicates a first location offset, and the first location offset is a location offset of an uplink demodulation reference signal DMRS. In the foregoing possible implementation, the first network device may indicate the first location offset by using the second configuration information, so that the user equipment can determine a time domain symbol location of the uplink DMRS in the uplink transmission resource based on the first location offset, and a collision between the uplink DMRS and a downlink CSI-RS can be effectively avoided.

In a possible implementation of the second aspect, the method further includes: sending uplink information to the first network device on the uplink transmission resource, where the uplink information includes uplink data and the uplink DMRS. In the foregoing possible implementation, interference from the uplink information can be avoided when the first network device receives the RS of the second network device.

In a possible implementation of the second aspect, a time domain location of the uplink DMRS in the first time unit is obtained by shifting an initial time domain location of the uplink DMRS by the first location offset, the first location offset is a location offset of the uplink DMRS, and a time length of the first time unit does not exceed one slot. In the foregoing possible implementation, if the RS is a CSI-RS and the time unit is a slot, location shifting is performed on the uplink DMRS in a slot in which there is a CSI-RS, without considering whether the CSI-RS collides with the uplink DMRS in the slot in which there is a CSI-RS. In this way, the time domain location of the uplink DMRS is shifted as a whole, to ensure that a maximum quantity of multiplexed users in one slot or a maximum quantity of multiplexed transport layers is the same as that in a slot in which there is no CSI-RS. Compared with another possible implementation described below, this implementation has a higher uplink multiplexing capability, and therefore has a larger uplink throughput.

Further, a time domain location of the uplink DMRS outside the first time unit is an initial time domain location of the uplink DMRS. In other words, a location offset of the uplink DMRS outside the first time unit in the uplink transmission resource is 0. This facilitates multiplexing of an UE with a different configuration and an UE with a same configuration.

In a possible implementation of the second aspect, when the uplink DMRS does not collide with an RS of the second network device, a time domain location of the uplink DMRS is an initial time domain location of the uplink DMRS; or when the uplink DMRS collides with an RS, a time domain location of the uplink DMRS is obtained by shifting an initial time domain location of the uplink DMRS by the first location offset, where the first location offset is a location offset of the uplink DMRS. In the foregoing possible implementation, if the RS is a CSI-RS and the time unit is a slot, location shifting is performed on the uplink DMRS in a slot in which there is a CSI-RS and the CSI-RS collides with the uplink DMRS. Compared with location shifting performed on the entire uplink DMRS in a slot in which there is a CSI-RS, this solution has better signal estimation performance. Location shifting is not performed on the uplink DMRS in another slot in which no collision occurs, so that multiplexing of UE with a different configuration and UE with a same configuration can be facilitated.

In a possible implementation of the second aspect, a time domain symbol occupied by the uplink DMRS after the uplink DMRS is shifted by the first location offset is different from a time domain symbol occupied by the first RS resource. In the foregoing possible implementation, location shifting is performed on the uplink DMRS in a slot in which there is a CSI-RS, so that a problem of collision between the uplink DMRS and the CSI-RS can be effectively avoided.

In a possible implementation of the second aspect, the first configuration information indicates the first RS resource; or the first configuration information indicates the uplink transmission resource. In the foregoing possible implementation, the first network device may indicate the first RS resource of the second network device or indicate the uplink transmission resource by using the first configuration information. The first RS resource or the uplink transmission resource may use an RE as a granularity, so that resource utilization can be improved, and wasted resources can be avoided.

In a possible implementation of the second aspect, the first configuration information and/or the second configuration information are/is carried in higher layer signaling. In this way, physical layer transmission resources can be saved. Because interference measurement is generally a long-term or periodic operation, interference measurement does not need to be dynamically scheduled. Optionally, the higher layer signaling is RRC signaling. The RRC signaling is UE-specific signaling. In this way, an amount of to-be-transmitted data can be reduced, and transmission reliability of the first configuration information can be ensured. Alternatively, the RRC signaling is cell-specific signaling. In this way, transmission resources can be saved, and transmission reliability of the first configuration information can be improved.

According to a third aspect, a communication apparatus is provided. The apparatus is used as a first network device or a chip built in the first network device, and the apparatus includes: a processing unit, configured to determine a first reference signal RS resource of a second network device in a time-frequency resource, where the time-frequency resource includes a plurality of time units in the time domain, the first RS resource is located in a first time unit in the time domain, and the plurality of time units include the first time unit; and a sending unit, configured to send first configuration information to user equipment, where the first configuration information is for determining an uplink transmission resource in the time-frequency resource, and the uplink transmission resource does not overlap the first RS resource.

In a possible implementation of the third aspect, an RS is a CSI-RS; and/or the time unit is a slot.

In a possible implementation of the third aspect, the sending unit is further configured to send second configuration information to the user equipment, where the second configuration information indicates a first location offset, and the first location offset is a location offset of an uplink demodulation reference signal DMRS.

In a possible implementation of the third aspect, a time domain symbol occupied by the uplink DMRS after the uplink DMRS is shifted by the first location offset is different from a time domain symbol occupied by the first RS resource.

In a possible implementation of the third aspect, the apparatus further includes: a receiving unit, configured to: receive an RS from the second network device on the first RS resource, and receive uplink information from the user equipment on the uplink transmission resource, where the uplink information includes uplink data and the uplink DMRS.

In a possible implementation of the third aspect, the time-frequency resource includes a plurality of RS resources of the second network device, and the first RS resource is a subset of the plurality of RS resources.

In a possible implementation of the third aspect, the first configuration information indicates the first RS resource; or the first configuration information indicates the uplink transmission resource.

In a possible implementation of the third aspect, the first configuration information and/or the second configuration information are/is carried in higher layer signaling. Optionally, the higher layer signaling is RRC signaling. For example, the RRC signaling is UE-specific signaling or cell-specific signaling.

According to a fourth aspect, a communication apparatus is provided. The apparatus is used as user equipment or a chip built in the user equipment, and the apparatus includes: a receiving unit, configured to receive first configuration information from a first network device, where the first configuration information is for determining an uplink transmission resource in a time-frequency resource; and a processing unit, configured to determine the uplink transmission resource based on the first configuration information, where the uplink transmission resource does not overlap a first reference signal RS resource of a second network device in the time-frequency resource, the time-frequency resource includes a plurality of time units in the time domain, the first RS resource is located in a first time unit in the time domain, and the plurality of time units include the first time unit.

In a possible implementation of the fourth aspect, an RS is a CSI-RS; and/or the time unit is a slot.

In a possible implementation of the fourth aspect, the receiving unit is further configured to: receive second configuration information from the first network device, where the second configuration information indicates a first location offset, and the first location offset is a location offset of a DMRS.

In a possible implementation of the fourth aspect, the apparatus further includes: a sending unit, configured to send uplink information to the first network device on the uplink transmission resource, where the uplink information includes uplink data and the uplink DMRS.

In a possible implementation of the fourth aspect, a time domain location of the uplink DMRS in the first time unit is obtained by shifting an initial time domain location of the uplink DMRS by the first location offset, the first location offset is a location offset of the uplink DMRS, and a time length of the first time unit does not exceed one slot.

In a possible implementation of the fourth aspect, when the uplink DMRS does not collide with an RS of the second network device, a time domain location of the uplink DMRS is an initial time domain location of the uplink DMRS; or when the uplink DMRS collides with an RS, a time domain location of the uplink DMRS is obtained by shifting an initial time domain location of the uplink DMRS by the first location offset, where the first location offset is a location offset of the uplink DMRS.

In a possible implementation of the fourth aspect, a time domain symbol occupied by the uplink DMRS after the uplink DMRS is shifted by the first location offset is different from a time domain symbol occupied by the first RS resource.

In a possible implementation of the fourth aspect, the first configuration information indicates the first RS resource; or the first configuration information indicates the uplink transmission resource.

In a possible implementation of the fourth aspect, the first configuration information and/or the second configuration information are/is carried in higher layer signaling. Optionally, the higher layer signaling is RRC signaling. For example, the RRC signaling is UE-specific signaling or cell-specific signaling.

According to another aspect of this application, a communication apparatus is provided. The apparatus includes a processor and a memory coupled to the processor. The processor may be configured to execute instructions in the memory, to enable the apparatus to perform the method provided in any one of the first aspect or the possible implementations of the first aspect. Optionally, the apparatus further includes a communication interface and a bus, and the processor, the memory, and the communication interface are coupled by using the bus.

According to another aspect of this application, a communication apparatus is provided. The apparatus includes a processor and a memory coupled to the processor. The processor may be configured to execute instructions in the memory, to enable the apparatus to perform the method provided in any one of the second aspect or the possible implementations of the second aspect. Optionally, the apparatus further includes a communication interface and a bus, and the processor, the memory, and the communication interface are coupled by using the bus.

According to another aspect of this application, an embodiment of this application provides a communication apparatus. The apparatus includes a processor and an interface circuit. The interface circuit is configured to: receive code instructions and transmit the code instructions to the processor; and the processor is configured to nm the code instructions, to enable the apparatus to perform the method in any one of the first aspect or the possible implementations of the first aspect.

According to another aspect of this application, an embodiment of this application provides a communication apparatus. The apparatus includes a processor and an interface circuit. The interface circuit is configured to: receive code instructions and transmit the code instructions to the processor; and the processor is configured to run the code instructions, to enable the apparatus to perform the method in any one of the second aspect or the possible implementations of the second aspect.

According to another aspect of this application, a communication system is provided. The communication system includes a first network device, a second network device, and user equipment that accesses the first network device. The first network device is configured to perform the method provided in any one of the first aspect or the possible implementations of the first aspect. The user equipment is configured to perform the method provided in any one of the second aspect or the possible implementations of the second aspect.

According to another aspect of this application, a computer-readable medium is provided. The computer-readable medium stores a computer program (which may also be referred to as code or an instruction). When the computer program is run on a computer, the computer is enabled to perform the method provided in any one of the first aspect or the possible implementations of the first aspect.

According to another aspect of this application, a computer-readable medium is provided. The computer-readable medium stores a computer program (which may also be referred to as code or an instruction). When the computer program is run on a computer, the computer is enabled to perform the method provided in any one of the second aspect or the possible implementations of the second aspect.

According to another aspect of this application, a computer program product is provided. The computer program product includes a computer program (which may also be referred to as code or an instruction). When the computer program is run, a computer is enabled to perform the method provided in any one of the first aspect or the possible implementations of the first aspect.

According to another aspect of this application, a computer program product is provided. The computer program product includes a computer program (which may also be referred to as code or an instruction). When the computer program is run, a computer is enabled to perform the method provided in any one of the second aspect or the possible implementations of the second aspect.

It may be understood that any communication apparatus, computer storage medium, or computer program product provided above is configured to perform the corresponding method provided above. Therefore, for beneficial effects that can be achieved by the communication apparatus, computer storage medium, or computer program product, refer to beneficial effects in the corresponding method provided above. Details are not described herein again.

DESCRIPTION OF EMBODIMENTS

In this application, the term "at least one" means one or more, and the term "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. The character "/" generally indicates an "or" relationship between the associated objects. "At least one item (piece) of the following" or a similar expression thereof means any combination of the items, including any combination of singular items (pieces) or plural items (pieces). For example, at least one (piece) of a, b, or c may indicate a, b, c, a and b, a and c, b and c, or a, b, and c, where a, b, and c may be singular or plural. In addition, in embodiments of this application, words such as "first" and "second" do not limit a quantity and an execution order.

It should be noted that in this application, the term such as "example" or "for example" is used to represent giving an example, an illustration, or descriptions. Any embodiment or design scheme described as an "example" or "for example" in this application should not be explained as being more preferable or having more advantages than another embodiment or design scheme. Exactly, use of the word such as "example" or "for example" is intended to present a related concept in a specific manner.

Technical solutions of this application may be applied to various communication systems, for example, an LTE time division duplex (TDD) system, a universal mobile telecommunications system (UMTS), a worldwide interoperability for microwave access (WiMAX) communication system, a public land mobile network (PLMN) system, a long time evolution (LTE) system, a new radio (NR) system, a 4.5G communication system, a 5G communication system, and various future wireless communication systems. The technical solutions of this application may include a plurality of application scenarios, for example, machine to machine (M2M), device to machine (D2M), device to device (D2D), macro-micro communication, enhanced mobile broadband (eMBB), ultra-reliability low-latency communication (uRLLC), and massive machine type communication (mMTC).

A network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

Figure 1:
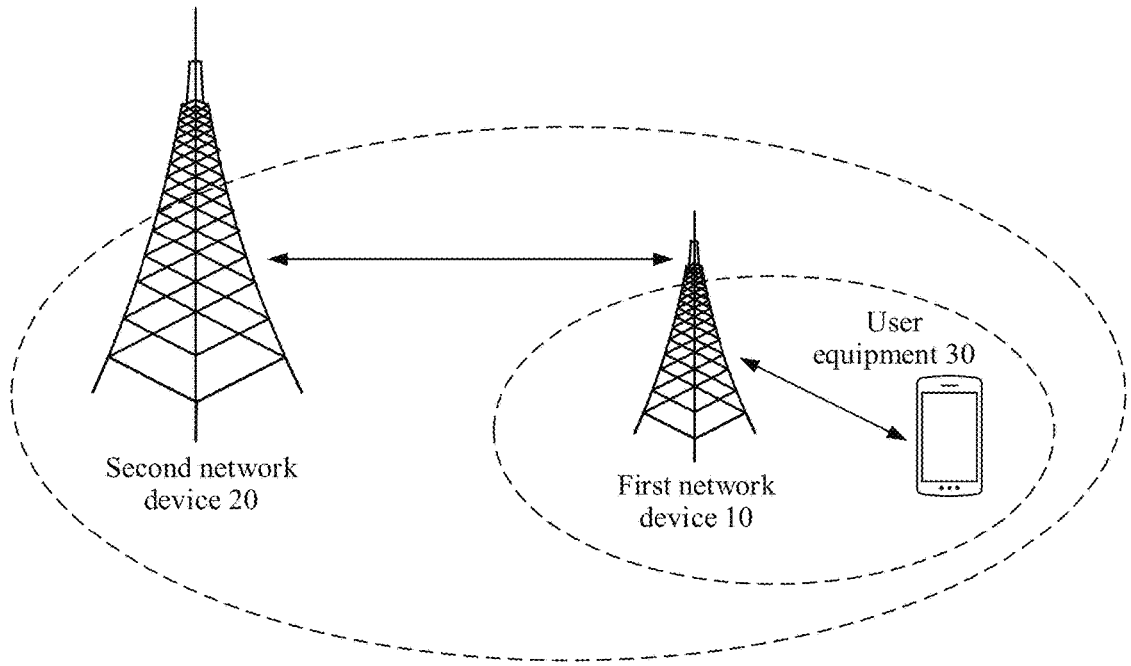
FIG. 1 is a schematic diagram of a structure of a communication system according to an embodiment of this application.

FIG. 1 is a schematic diagram of a structure of a communication system according to an embodiment of this application. The communication system includes a first network device 10, a second network device 20, and user equipment 30. The first network device 10 may communicate with the second network device 20 and the user equipment 30. The first network device 10 may be a network device located in a service range of the second network device 20. The first network device 10 may receive information delivered by the second network device 20 to user equipment that accesses the second network device 20. For example, the information may include a reference signal (RS) delivered by the second network device 20. In an embodiment, baseband processors of the first network device 10 and the second network device 20 are on a same circuit board or on different circuit boards, and the first network device 10 and the second network device 20 exchange information through an X2 interface or an air interface. The user equipment 30 may be user equipment that accesses the first network device 10. The first network device 10 may send information to the user equipment 30, and the user equipment 30 may send information to the first network device 10. For example, the first network device may send configuration information or scheduling information to the user equipment 30, and the user equipment 30 may send data to the first network device 10.

The user equipment 30 may be a device that has a wireless communication function, and may be deployed on the land, including an indoor or outdoor device, a handheld device, or a vehicle-mounted device, or may be deployed on the water (for example, on a ship), or may be deployed in the air (for example, on a plane, a balloon, or a satellite). The user equipment (UE) may also be referred to as a terminal, a mobile station (MS), a mobile terminal (MT), a terminal device, or the like, and is a device that provides voice and/or data connectivity for a user. For example, the user equipment 30 includes a handheld device or a vehicle-mounted device that has a wireless connection function. Currently, the user equipment 30 may be a mobile phone, a tablet, a notebook computer, a palmtop computer, a mobile internet device (MID), a wearable device (such as a smart watch, a smart band, or a pedometer), a vehicle-mounted device (such as a car, a bicycle, an electric vehicle, an airplane, a ship, a train, or a high-speed railway), a virtual reality (VR) device, an augmented reality (AR) device, a wireless terminal under industrial control, a smart home device (such as a refrigerator, a television, an air conditioner, or an electricity meter), a smart robot, a workshop device, a self-driving wireless terminal, a wireless terminal in a remote surgery, a wireless terminal in a smart grid, a wireless terminal in transportation safety, a wireless terminal in a smart city, a wireless terminal in a smart home, a flight device (such as a smart robot, a hot balloon, an uncrewed aerial vehicle, or an aircraft), or the like. In a possible application scenario of this application, the terminal is a terminal device that often works on the ground, for example, a vehicle-mounted device. In this application, for ease of description, a chip deployed in the foregoing device, for example, a system-on-a-chip (SOC) or a baseband chip, or another chip that has a communication function may also be referred to as user equipment.

For example, in this embodiment of this application, the user equipment 30 may further include a wearable device. The wearable device may also be referred to as a wearable intelligent device, and is a general term of wearable devices such as glasses, gloves, watches, clothes, and shoes that are developed by applying wearable technologies in intelligent designs of daily wear. The wearable device is a portable device that is directly worn on a body or integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, both the first network device 10 and the second network device 20 may be referred to as network devices. The network device may be an entity that is used together with the user equipment and that may be configured to transmit or receive a signal. The network device may also be referred to as an access network device. For example, the network device may be an access point (AP) in WLAN, or may be an evolved NodeB (eNB or eNodeB), a relay station or an access point, a vehicle-mounted device, or a wearable device in LTE, a network device in a future 5G network, or an access network device in a future evolved PLMN network. In this embodiment of this application, the network device may provide a service for a cell, and the user equipment may communicate with the network device by using a transmission resource (for example, a time domain resource, a frequency domain resource, or a time-frequency resource) used by the cell. The cell may be a cell corresponding to the access network device (for example, a base station). The cell may belong to a macro base station, or may belong to a base station corresponding to a small cell. The small cell herein may include a metro cell, a micro cell, a pico cell, a femto cell, and the like. Such small cells have features of small coverage and low transmit power, and are applicable to providing a high-rate data transmission service. In a possible embodiment, the first network device 10 may be a micro base station, and the second network device 20 may be a macro base station.

The following describes terms used in embodiments of this application.

In a wireless communication system, communication may be classified into different types based on different types of sending nodes and receiving nodes. Generally, sending information by a network device (for example, a base station) to UE is referred to as downlink (DL) communication, and sending information by UE to a network device is referred to as uplink (UL) communication. Time-frequency resources used for uplink communication and downlink communication may be divided into a plurality of radio frames in the time domain, each radio frame may include a plurality of slots (time slots, TSs), each slot may include a plurality of symbols, and include a plurality of physical resource blocks (PRBs) in frequency domain, and each PRB may include a plurality of subcarriers. An NR system is used as an example. A length of one radio frame is 10 ms. If a length of one slot is 0.5 ms, one radio frame may include 20 slots, one slot may include 14 symbols, and the symbol may be an orthogonal frequency division multiplexing (OFDM) symbol. A transmission direction of the OFDM symbol in one slot may be DL, UL, or flexible, and a combination of transmission directions of symbols in one slot may be understood as a format of the slot. For example, several slot formats are specified in the TS 38.211 standard of the NR system shown in Table 1.

TABLE 1

| | Quantity of symbols in one slot | | | | | | | | | | | | | |
| --- | --- | --- | --- | --- | --- | --- | --- | --- | --- | --- | --- | --- | --- | --- |
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| ... | | | | | | | | | | | | | | |
| 27 | D | D | D | X | X | X | X | X | X | X | X | U | U | U |
| ... | | | | | | | | | | | | | | |

In Table 1, D represents DL, U represents UL, and X represents flexible. The format 27 is used as an example. A slot format represented by the format 27 is as follows: The first three symbols are used for DL transmission, the last three symbols are used for UL transmission, and the middle eight symbols are flexible. In other words, the eight symbols may be used for uplink transmission, or may be used for downlink transmission, or may not be used for transmission.

A ratio of a quantity of uplink symbols to a quantity of downlink symbols in one slot may be referred to as an uplink-downlink configuration of the slot. The uplink symbol may be a symbol used for uplink communication, and the downlink-symbol may be a symbol used for downlink communication. When most symbols in one slot are uplink symbols, the slot may be referred to as an uplink slot. When most symbols in one slot are downlink symbols, the slot may be referred to as a downlink slot. The network device may implement time division multiplexing (TDD) by configuring the uplink slot and the downlink slot on a same frequency domain resource. Specifically, the network device may alternately configure the uplink slot and the downlink slot on a same carrier to implement TDD. A ratio of a quantity of downlink slots to a quantity of uplink slots in the time domain is referred to as a TDD uplink-downlink configuration. For example, 8:2 is a very common configuration solution. To be specific, every 10 slots include eight consecutive downlink slots, followed by two consecutive uplink slots.

A slot with a different configuration may mean that uplink-downlink configurations of two network devices (a first network device serving as a micro base station and a second network device serving as a macro base station) in the slot are inconsistent. For example, the macro base station uses an uplink-downlink configuration with more downlink symbols and fewer uplink symbols (where for example, a slot format is DSUDD, and S is a special frame), and the micro base station uses an uplink-downlink configuration with more uplink symbols and fewer downlink symbols (where for example, a slot format is USUUU). As a result, the slot is a downlink slot for the macro base station but an uplink slot for the micro base station.

An UE with a different configuration may be an UE whose uplink-downlink configuration is different from a macro network configuration. To be specific, an uplink-downlink configuration of the UE for one slot is inconsistent with an uplink-downlink configuration of the macro base station for the slot. For example, the slot is a downlink slot for the macro base station, but the slot is an uplink slot for the UE. An UE with a same configuration may be an UE whose uplink-downlink configuration is the same as a macro network configuration. To be specific, an uplink-downlink configuration of the UE for one slot is consistent with an uplink-downlink configuration of the macro base station for the slot. For example, the slot is a downlink slot for the macro base station, and the slot is also a downlink slot for the UE. Alternatively, the UE with a different configuration may be understood as indicating that a physical uplink shared channel (PUSCH) of the UE may collide with a reference signal (for example, a channel state information (CSI)-reference signal (RS)) of the macro base station; and the UE with a same configuration may be understood as indicating that a PUSCH of the UE does not collide with a reference signal (for example, a CSI-RS) of the macro base station.

In this specification, a collision may refer to two transmitting ends sending signals on a same time-frequency resource, and consequently a receiving end cannot separate two signals from the received signals. For example, the macro base station and UE (namely, micro UE) that accesses the micro base station respectively send a CSI-RS and uplink information on a same time-frequency resource, and the micro base station cannot separate the CSI-RS and the uplink information that are received on the time-frequency resource.

Figure 2:
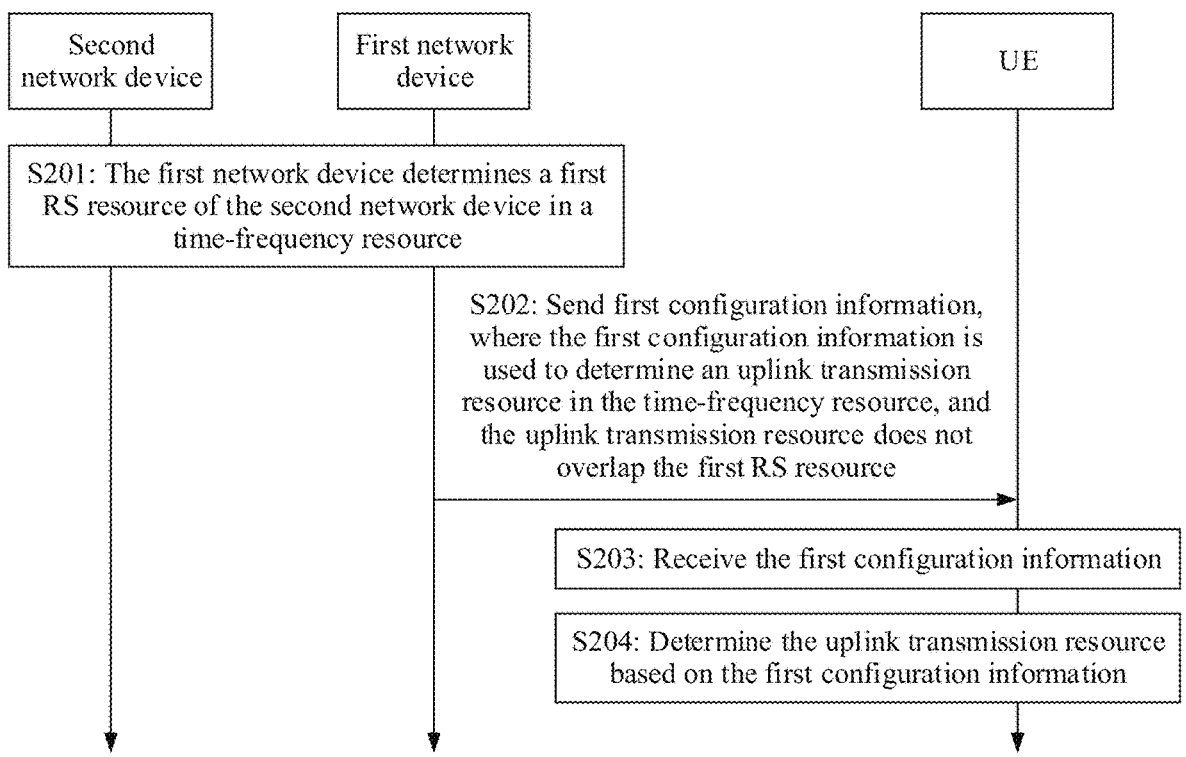
FIG. 2 is a schematic flowchart of an uplink transmission resource indication method according to an embodiment of this application.

FIG. 2 is a schematic flowchart of an uplink transmission resource indication method according to an embodiment of this application. The method may be applied to the communication system shown in FIG. 1. The method includes the following several steps.

S201: A first network device determines a first RS resource of a second network device in a time-frequency resource, where the time-frequency resource includes a plurality of time units in the time domain, the first RS resource is located in a first time unit in the time domain, and the plurality of time units include the first time unit.

The time-frequency resource may be a resource used for communication between the first network device and user equipment, and the time-frequency resource may include a time domain resource and a frequency domain resource. The time-frequency resource includes a plurality of time units in frequency domain, and one time unit may be one slot. The first RS resource may be a resource used to transmit an RS, the first RS resource is a part of the time-frequency resource, and the first RS resource is located in the first time unit in the time domain (where for example, the first RS resource includes some symbols in the first time unit in the time domain). The first time unit may include one or more slots, and the plurality of time units include the first time unit. The RS may be a CSI-RS. Therefore, the first RS resource is a first CSI-RS resource.

In addition, the first network device may be located in a service range of the second network device, and the may be one or more second network devices herein. That the first network device is located in a service range of the second network device may also be referred to as that the first network device is adjacent to the second network device. Therefore, the first network device may be adjacent to one or more second network devices.

In addition, when there is one second network device, the first RS resource of the second network device in S201 may include an RS resource of the second network device. When there are a plurality of second network devices, the first RS resource of the second network device in S201 may include RS resources of the plurality of second network devices. A first RS resource of a second network device may be a part of all RS resources of the second network device (that is, the first RS resource is a subset of all the RS resources), or may include all the RS resources of the second network device. When the first RS resource is a part of all the RS resources, measurement complexity may be reduced when the first network device subsequently performs interference measurement on the first RS resource by using an RS (for example, a CSI-RS) of the second network device.

Figure 3:
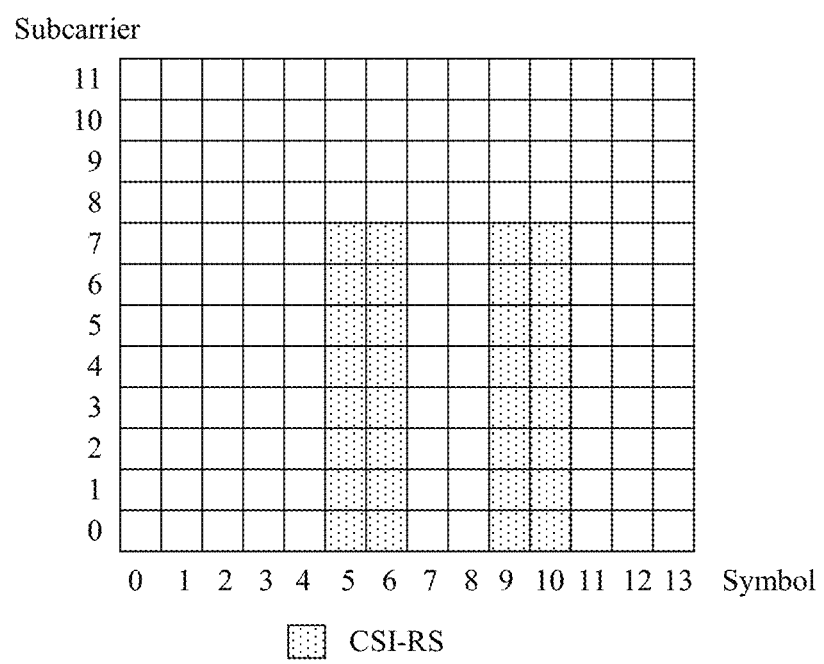
FIG. 3 is a schematic diagram of a CSI-RS in a PRB according to an embodiment of this application.

Specifically, the first network device may determine a surrounding second network device according to network planning, and exchange information with the second network device through an X2 interface or an air interface, to obtain a first RS resource of the second network device. For example, a configuration periodicity of obtaining a CSI-RS of the second network device by the first network device through the X2 interface or the air interface is 10 ms (one radio frame). The CSI-RS is sent in the $3^{rd}$ slot of each radio frame by using a resource $\Psi=\{$frequency domain: a PRB 0, a PRB 2, a PRB 4, . . . , a PRB 199, and subcarriers 0 to 7 in each PRB; time domain: the $3^{rd}$ slot of each radio frame, and a symbol 5, a symbol 6, a symbol 9, and a symbol 10 in each PRB$\}$, and then the first network device may determine the resource $\Psi$ as the first CSI-RS resource. In FIG. 3, one PRB in the $3^{rd}$ slot is used as an example to show a CSI-RS resource on the PRB. In FIG. 3, an example in which each PRB includes 12 subcarriers and each slot includes 14 symbols is used for description.

Optionally, the first network device may further obtain an uplink-downlink configuration of the second network device through the X2 interface or the air interface, and determine, based on the uplink-downlink configuration of the second network device and an uplink-downlink configuration of the first network device, a slot with a different configuration, an UE with a different configuration that accesses the first network device, and the like.

S202: The first network device sends first configuration information to the UE, where the first configuration information is for determining an uplink transmission resource in the time-frequency resource, and the uplink transmission resource does not overlap the first RS resource.

The user equipment may be user equipment that accesses the first network device. The uplink transmission resource is a resource used by the user equipment to transmit uplink information, and the uplink information may include uplink data and an uplink demodulation reference signal (DMRS).

In an embodiment, the first configuration information may indicate the first RS resource. Therefore, the uplink transmission resource may be a resource other than the first RS resource in the time-frequency resource. For example, the RS is a CSI-RS, the first configuration information indicates a CSI-RS pattern, and the first configuration information may include information such as a configuration periodicity of the CSI-RS, a PRB occupied by the CSI-RS, and an RE location occupied by the CSI-RS in the PRB. In another embodiment, the first configuration information directly indicates the uplink transmission resource. For example, the first configuration information indicates a PUSCH pattern. In other words, the first configuration information may include information such as a PRB occupied by the uplink information and an RE location occupied by the uplink information in the PRB.

Optionally, the first network device may send the first configuration information to an UE with a different configuration by using higher layer signaling. The first configuration information is for determining the uplink transmission resource in the time-frequency resource. The UE with a different configuration herein may be an UE whose uplink-downlink configuration is different from a macro network configuration. To be specific, the uplink-downlink configuration of the UE is different from the uplink-downlink configuration of the second network device. In a manner of sending the first configuration information to the UE with a different configuration by using higher layer signaling, physical layer transmission resources can be saved. Because interference measurement is generally a long-term or periodic operation, interference measurement does not need to be dynamically scheduled. In addition, even if the second network device dynamically schedules the CSI-RS, the first network device may consider the CSI-RS as occasional interference, and does not perform processing.

The higher layer signaling may be radio resource control (RRC) signaling or other higher layer signaling. Optionally, the RRC signaling may be UE-specific signaling or cell-specific signaling. When the RRC signaling is UE-specific signaling, an amount of to-be-transmitted data can be reduced, and transmission reliability of the first configuration information can be ensured. When the RRC signaling is cell-specific signaling, transmission resources can be saved, and transmission reliability of the first configuration information can be improved. The following separately describes in detail implementations when the RRC signaling is UE-specific signaling or cell-specific signaling.

UE-specific signaling: The first network device sends, by using the UE-specific signaling, the first configuration information to all UEs with different configurations that access the first network device. To be specific, for each of all the UEs with different configurations, the first network device may send, by using one piece of UE-specific signaling, the first configuration information to the UE with a different configuration. Specifically, for any UE with a different configuration, the first network device may determine a CSI-RS pattern in a bandwidth or a bandwidth part of the UE based on the CSI-RS pattern, a location of an uplink slot of the UE, and the bandwidth or the bandwidth part of the UE, to notify the UE by using the RRC signaling, where the RRC signaling is the UE-specific signaling. For example, UEs that access the first network device include UE 1 to UE 3, and the UE 1 and the UE 2 are UEs with different configurations. In this case, the first network device sends one piece of UE-specific signaling to the UE 1, and also sends one piece of UE-specific signaling to the UE 2. The UE-specific signaling includes the first configuration information, and the first configuration information indicates the first CSI-RS resource. For example, the first CSI-RS resource is $\Psi 1=$\{frequency domain: a PRB 0, a PRB 2, a PRB 4, . . . , a PRB 98, and subcarriers 0 to 7 in each PRB: time domain: the $3^{rd}$ slot of each radio frame, and a symbol 5, a symbol 6, a symbol 9, and a symbol 10 in each PRB\}.

Cell-specific signaling: The first network device sends, by using the cell-specific signaling, the first configuration information to all UEs that access the first network device, that is, the first network device sends the same RRC signaling to all the UEs that access the first network device. Specifically, the first network device may send, in a broadcast manner, the CSI-RS pattern to each UE that accesses the first network device. Each UE may determine, based on an uplink-downlink configuration of the UE, whether to read the cell-specific signaling. If the UE is an UE with a different configuration, the UE reads the cell-specific signaling; if the UE is an UE with a same configuration, the UE does not read the cell-specific signaling. For example, if UEs that access the first network device include UE 1 to UE 3, and the UE 1 and the UE 2 are UEs with different configurations, the first network device sends the cell-specific signaling to the UE 1 to the UE 3 through a broadcast channel, and the UE 1 and the UE 2 read the received cell-specific signaling. In this way, it is determined, based on the first configuration information in the cell-specific signaling, that the first CSI-RS resource is $\Psi 1=$\{frequency domain: a PRB 0, a PRB 2, a PRB 4, . . . , a PRB 98, and subcarriers 0 to 7 in each PRB; time domain: the $3^{rd}$ slot of each radio frame, and a symbol 5, a symbol 6, a symbol 9, and a symbol 10 in each PRB\}. The UE 3 does not read the first configuration information when receiving the cell-specific signaling.

Certainly, during actual application, the first network device may alternatively send the first configuration information to the UE with a different configuration by using physical layer signaling. This is not specifically limited in this embodiment of this application.

S203: The UE receives the first configuration information. It should be noted that related descriptions of the first configuration information are consistent with the related descriptions of the first configuration information in S202. For details, refer to the related descriptions in S202. Details are not described herein again in this embodiment of this application.

S204: The UE determines the uplink transmission resource based on the first configuration information.

The uplink transmission resource may be a part of the time-frequency resource. Therefore, the uplink transmission resource may also include a plurality of time units in the time domain, each time unit may be a slot or a plurality of symbols, and may include a plurality of PRBs in frequency domain, and each PRB may include a plurality of subcarriers.

Specifically, when the first configuration information indicates the first RS resource, the UE may determine the first RS resource based on the first configuration information. The first RS resource may be indicated by using a resource element (RE) as a granularity. For example, the first configuration information may indicate a time domain symbol and a frequency domain subcarrier that are occupied by the first RS resource. Further, the first network device may send, to the UE, indication information indicating an uplink transmission PRB. To be specific, the indication information indicates, by using a PRB as a granularity, a PRB resource used for uplink transmission. The indication information may be carried in higher layer signaling or physical layer signaling. This is not specifically limited in this embodiment of this application. When the first network device receives the indication information, the first network device may determine, as the uplink transmission resource, an RE other than an RE occupied by the first RS resource in the uplink transmission PRB.

Alternatively, when the first configuration information indicates the uplink transmission resource, the uplink transmission resource may be indicated by using an RE as a granularity. For example, the first configuration information indicates a PRB occupied by the uplink transmission resource, and a time domain symbol and a frequency domain subcarrier that are occupied in each PRB, so that the UE can directly determine the uplink transmission resource based on the first configuration information.

Figure 4:
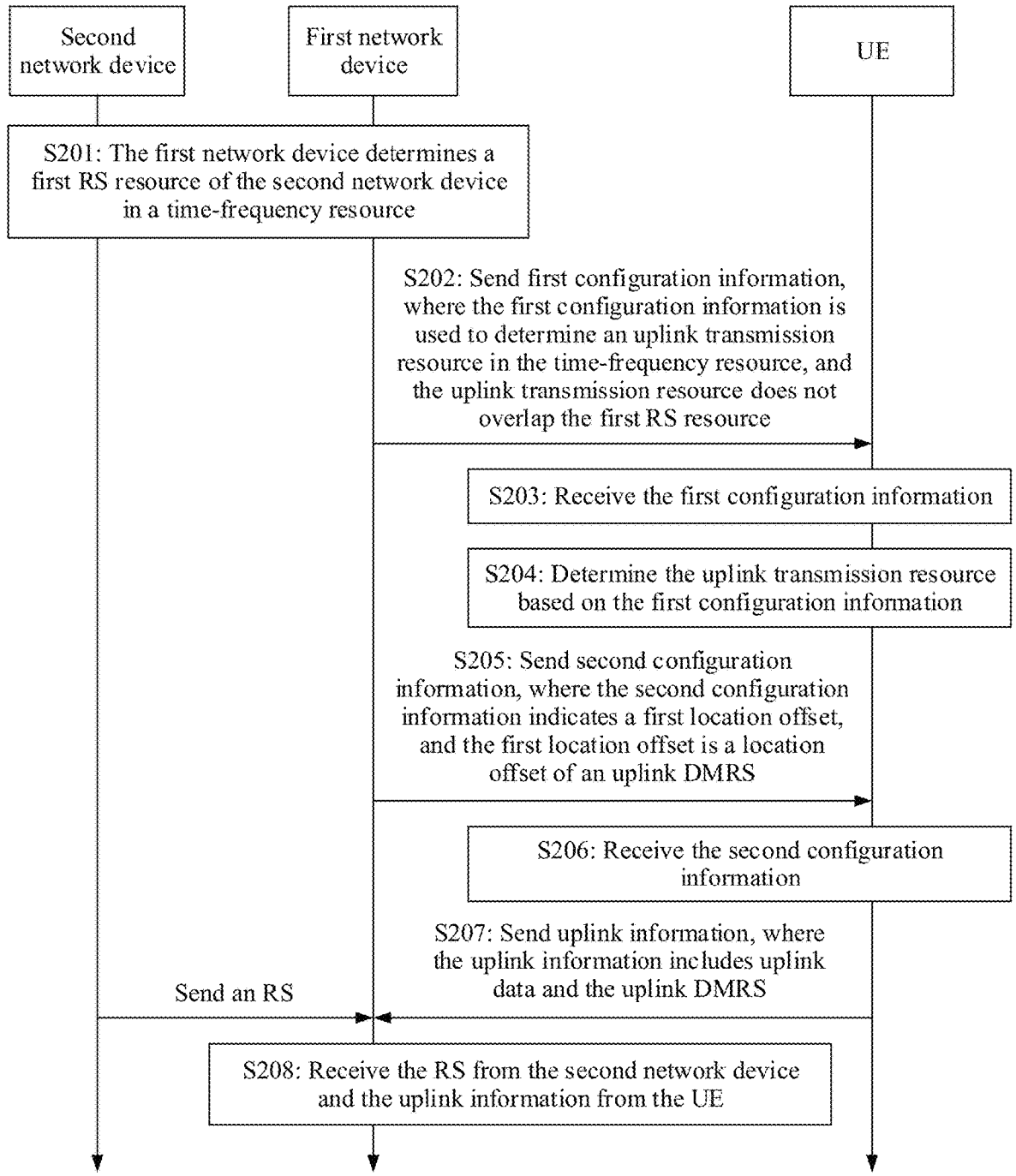
FIG. 4 is a schematic flowchart of another uplink transmission resource indication method according to an embodiment of this application.

Further, refer to FIG. 4. The method further includes S205 and S206. There may be no sequence between S205 and S206 and S203 and S204. In FIG. 4, an example in which S205 and S206 are performed after S203 and S204 is used for description.

S205: The first network device sends second configuration information to the UE, where the second configuration information indicates a first location offset, and the first location offset is a location offset of the uplink DMRS.

Figure 5:
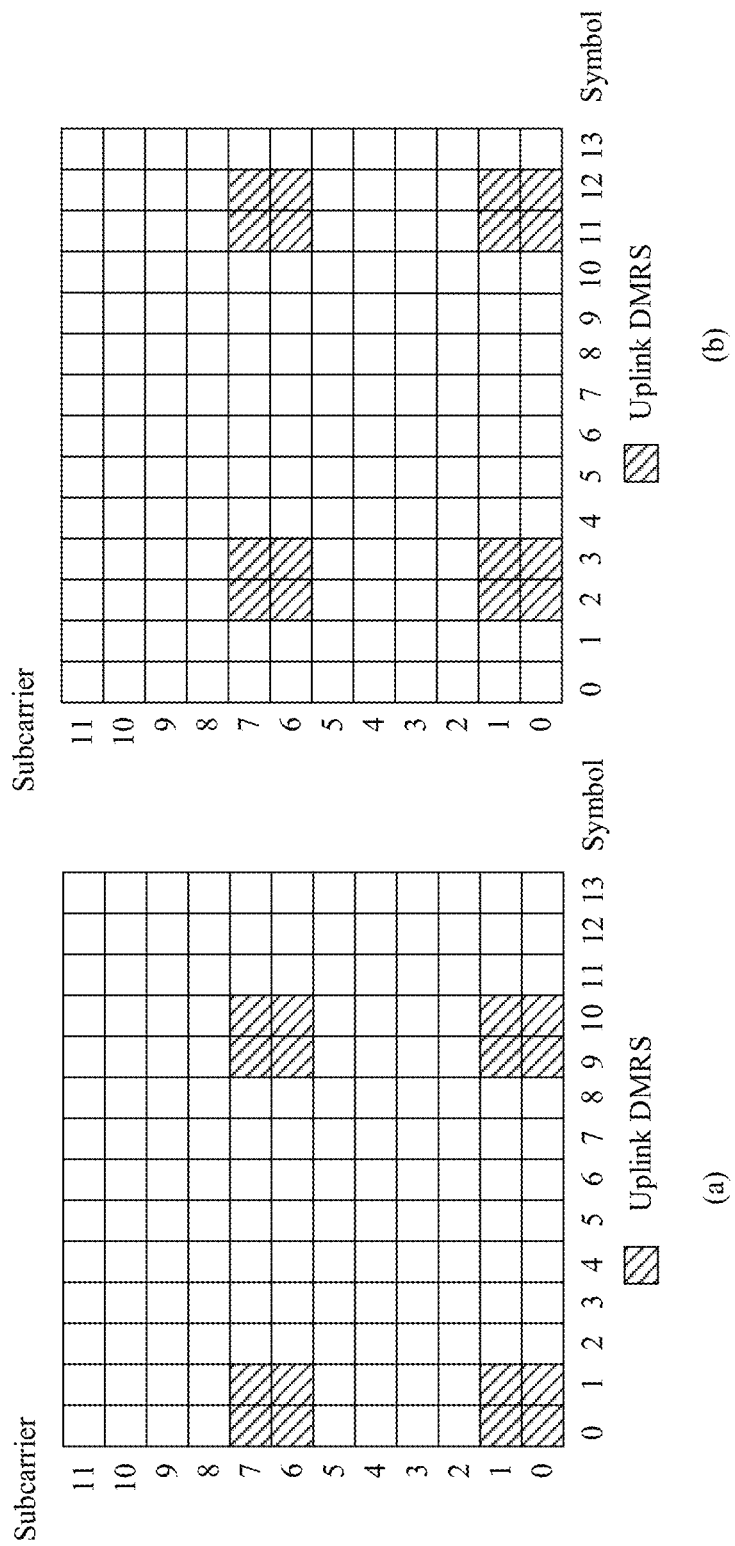
FIG. 5 is a schematic diagram of an uplink DMRS in a PRB according to an embodiment of this application.

The first location offset may include a location offset of the uplink DMRS. The location offset may be used to perform location shifting on a plurality of uplink DMRSs in one time unit, to be specific, shift each of initial time domain locations of the uplink DMRSs in one time unit by the first location offset. For example, as shown in FIG. 5, if the first location offset is {+2}, and initial time domain locations of uplink DMRSs in one PRB in one time unit are a symbol 0, a symbol 1, a symbol 9, and a symbol 10, the initial time domain locations of the uplink DMRSs in the PRB in the time unit may be respectively a symbol 2, a symbol 3, a symbol 11, and a symbol 12 after being shifted backward by two symbols. (a) in FIG. 5 shows the initial time domain location of the uplink DMRS, and (b) in FIG. 5 shows the time domain location of the uplink DMRS after the uplink DMRS is shifted by the first location offset. In FIG. 5, an example in which the uplink DMRS occupies subcarriers 0 and 1 and subcarriers 6 and 7 in the frequency domain is used for description.

Figure 6:
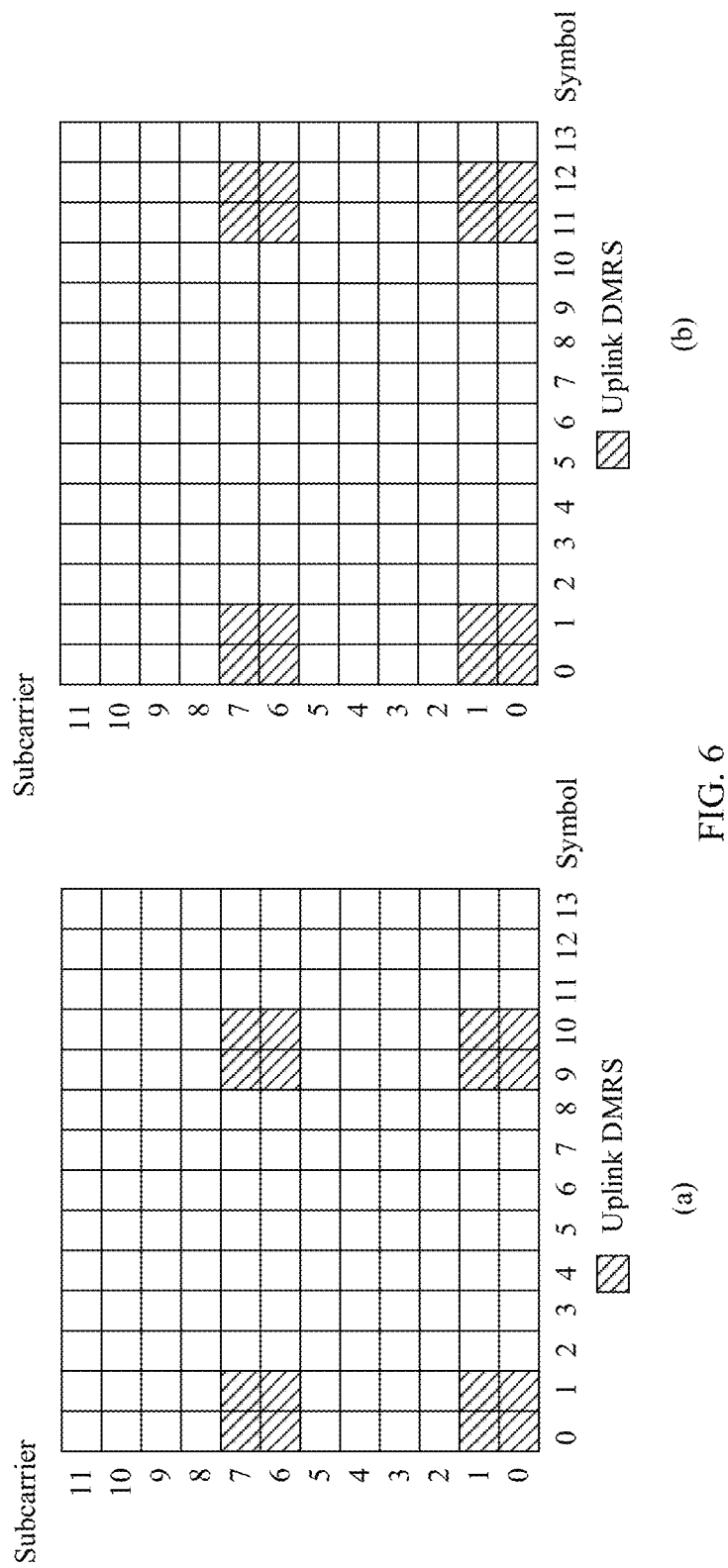
FIG. 6 is a schematic diagram of an uplink DMRS in another PRB according to an embodiment of this application.

Alternatively, as shown in FIG. 6, the first location offset includes a plurality of location offsets of uplink DMRSs, each location offset corresponds to one or more uplink DMRSs, and the plurality of location offsets may be used to respectively perform location shifting on the plurality of uplink DMRSs in one time unit, to be specific, respectively shift initial time domain locations of the plurality of uplink DMRSs in one time unit by different location offsets. For example, if the first location offset is {0, +2}, and initial time domain locations of uplink DMRSs in one PRB in one time unit are a symbol 0, a symbol 1, a symbol 9, and a symbol 10, location shifting is not performed on the symbol 0 and the symbol 1 in the initial time domain locations of the uplink DMRSs in the PRB in the time unit (that is, the symbols are shifted by 0 symbols), and the symbol 9 and the symbol 10 in the initial time domain locations of the uplink DMRSs in the PRB in the time unit are respectively shifted backward by two symbols to obtain a symbol 11 and a symbol 12. (a) in FIG. 6 shows the initial time domain location of the uplink DMRS. (b) in FIG. 6 shows the time domain location of the uplink DMRS after the uplink DMRS is shifted by the first location offset. One uplink DMRS herein may be an uplink DMRS on one symbol. In FIG. 6, an example in which the uplink DMRS occupies subcarriers 0 and 1 and subcarriers 6 and 7 in frequency domain is used for description.

In an embodiment, the first location offset may take effect only in a slot in which there is a CSI-RS, and does not take effect in a slot in which there is no CSI-RS. In other words, location shifting is performed only on an uplink DMRS in the slot in which there is a CSI-RS, and a shifted time domain location of the uplink DMRS does not overlap the CSI-RS. In this case, whether the CSI-RS collides with the uplink DMRS in the slot in which there is a CSI-RS may not be considered. Location shifting is performed on the uplink DMRS in a slot in which there is a CSI-RS, without considering whether the CSI-RS collides with the uplink DMRS in the slot in which there is a CSI-RS. In this way, the time domain location of the uplink DMRS is shifted as a whole, to ensure that a maximum quantity of multiplexed users in one slot or a maximum quantity of multiplexed transport layers is the same as that in a slot in which there is no CSI-RS. Compared with another embodiment described below, this manner has a higher uplink multiplexing capability, and therefore has a larger uplink throughput. Further, a time domain location of the uplink DMRS outside the first time unit is an initial time domain location of the uplink DMRS. In other words, a location offset of the uplink DMRS outside the first time unit in the uplink transmission resource is 0. This facilitates multiplexing of an UE with a different configuration and an UE with a same configuration.

Figure 7:
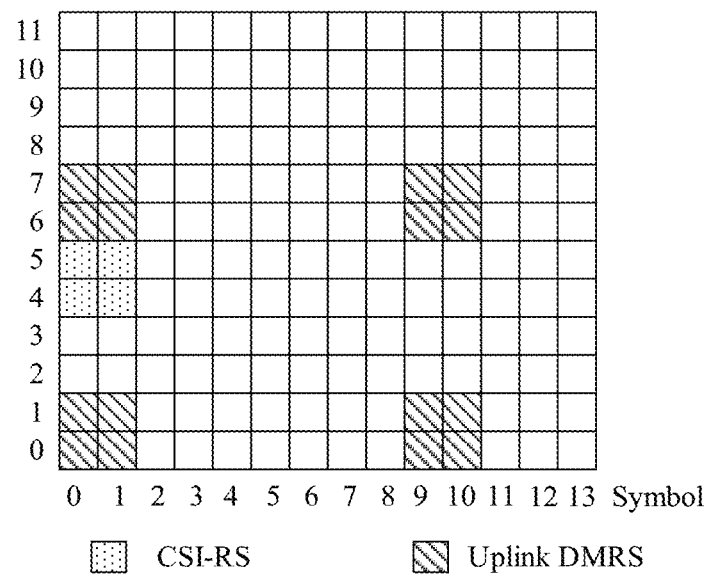
FIG. 7 is a schematic diagram of a CSI-RS and a DMRS in a PRB according to an embodiment of this application.

For example, the uplink transmission resource includes 10 slots that are respectively represented as slots 0 to 9, there is a CSI-RS in the slot 2 of the 10 slots, and the CSI-RS is located on an even-numbered PRB. If the first location offset is {+2}, and initial slot symbol locations of uplink DMRSs are a symbol 0, a symbol 1, a symbol 9, and a symbol 10, the initial symbol locations of the uplink DMRSs on the even-numbered PRB in the slot 2 may be respectively a symbol 2, a symbol 3, a symbol 11, and a symbol 12 after being shifted backward by two symbols, and uplink DMRSs in the slots 0 and 1 and the slots 3 to 9 maintain initial symbol locations. To be specific, time domain locations of the uplink DMRSs in the slots 0 and 1 and the slots 3 to 9 are the symbol 0, the symbol 1, the symbol 9, and the symbol 10. In this case, if both a time domain symbol and a frequency domain subcarrier that are occupied by the CSI-RS on the even-number PRB are the same as a time domain symbol and a frequency domain subcarrier that are occupied when the uplink DMRS is at the initial time domain location, the uplink DMRS collides with the CSI-RS. If a time domain symbol occupied by the CSI-RS on the even-numbered PRB is different from a time domain symbol occupied when the uplink DMRS is at the initial time domain location, or a time domain symbol occupied by the CSI-RS on the even-numbered PRB is the same as a time domain symbol occupied when the uplink DMRS is at the initial time domain location but occupied frequency domain subcarriers are different, the uplink DMRS does not collide with the CSI-RS. FIG. 7 is a schematic diagram of a PRB in which there is a CSI-RS in a slot 2. If the CSI-RS occupies a symbol 0 and a symbol 1 in the PRB, and occupies a subcarrier 4 and a subcarrier 5 in frequency domain, when an uplink DMRS on the PRB occupies a symbol 0, a symbol 1, a symbol 9, and a symbol 10 at an initial time domain location, and occupies a subcarrier 0 and a subcarrier 1 in frequency domain, the uplink DMRS does not collide with the CSI-RS. In this case, the DMRS on the PRB may also be shifted backward by the first location offset.

In another embodiment, the first location offset may take effect only in a slot in which there is a CSI-RS and the uplink DMRS collides with the CSI-RS. In this case, whether the CSI-RS collides with the DMRS in the slot in which there is a CSI-RS is considered. If the uplink DMRS collides with the CSI-RS, location shifting is performed on the uplink DMRS in the slot, where a shifted time domain location of the DMRS does not overlap the CSI-RS. If the uplink DMRS does not collide with the CSI-RS, location shifting is not performed on the uplink DMRS in the slot. That the uplink DMRS collides with the CSI-RS may mean that the uplink DMRS and the CSI-RS occupy a same RE of a same symbol on a same PRB. Location shifting is performed on the uplink DMRS in the slot in which there is a CSI-RS and the DMRS collides with the CSI-RS. Compared with location shifting performed on the entire uplink DMRS in the slot in which there is a CSI-RS, this solution has better signal estimation performance. Location shifting is not performed on the uplink DMRS in another slot in which no collision occurs, so that multiplexing of an UE with a different configuration and an UE with a same configuration can be facilitated.

In still another embodiment, the first location offset takes effect in each of the plurality of slots included in the uplink transmission resource. In this case, location shifting is performed on an uplink DMRS in a slot in which there is a CSI-RS, and location shifting is also performed on an uplink DMRS in a slot in which there is no CSI-RS.

Specifically, the first network device may determine the first location offset based on the uplink transmission resource and the initial time domain location of the uplink DMRS, and send the first configuration information to the UE by using higher layer signaling or physical layer signaling. The higher layer signaling may be RRC signaling, and the RRC signaling may be UE-specific signaling or cell-specific signaling. Related descriptions of specifically sending, by the first network device, the second configuration information to the UE by using the UE-specific signaling or the cell-specific signaling are similar to the related descriptions of sending, by the first network device, the first configuration information to the UE by using the UE-specific signaling or the cell-specific signaling in S202. For details, refer to the descriptions in S202. Details are not described herein again in this embodiment of this application.

Certainly, during actual application, the first location offset and the slot in which the first location offset takes effect may also be predefined, or an uplink DMRS offset rule and an effective slot are predefined for the first network device and the UE. For example, the offset rule may be shifting backward to a collision-free symbol, or shifting forward to a collision-free symbol, so that the first network device and the UE can perform corresponding operations based on a predefined first location offset or according to a predefined uplink DMRS offset rule.

It should be noted that, when a symbol location obtained after location shifting is performed on an uplink DMRS in one slot exceeds a symbol location included in the slot, a time domain location of the uplink DMRS may be moved to another symbol location on which no collision occurs.

S206: The UE receives the second configuration information. It should be noted that for related descriptions of the second configuration information in S206 and related descriptions of determining, by the UE, the uplink DMRS in the uplink transmission resource based on the second configuration information, refer to the related descriptions in S205. Details are not described herein again in this embodiment of this application.

Further, refer to FIG. 4. The method further includes S207 and S208.

S207: The UE sends uplink information to the first network device on the uplink transmission resource, where the uplink information includes uplink data and an uplink DMRS.

Specifically, the UE may send, to the first network device on the uplink transmission resource, the uplink data and the uplink DMRS used to demodulate the uplink data. A time domain location of the uplink DMRS in the uplink transmission resource may be determined by the UE based on the second configuration information or according to the predefined uplink DMRS offset rule. For related descriptions of specifically determining the time domain location of the uplink DMRS in the uplink transmission resource, refer to the related descriptions in 205. Details are not described herein again in this embodiment of this application.

Further, before the UE sends the uplink information to the first network device, the first network device may send scheduling information to the UE, where the scheduling information is for scheduling the uplink information on the time-frequency resource, so that when the UE receives the scheduling information, the UE can send the uplink information to the first network device on the uplink transmission resource.

S208: The first network device receives an RS from the second network device on the first RS resource, and receives the uplink information from the user equipment on the uplink transmission resource.

When the UE sends the uplink information to the first network device on the uplink transmission resource, the second network device may also send the RS to the first network device on the first RS resource. For example, the RS is a CSI-RS. Therefore, the first network device may receive the RS from the second network device on the first RS resource in the time-frequency resource, receive the uplink information from the user equipment on the uplink transmission resource in the time-frequency resource, and perform interference measurement based on the received CSI-RS.

In this embodiment of this application, the first network device may send the first configuration information to the UE, to indicate the first RS resource of the second network device or indicate the uplink transmission resource of the UE by using the first configuration information. The first RS resource or the uplink transmission resource may use an RE as a granularity. Therefore, the UE can transmit the uplink information in a slot in which the RS of the second network device is located, to avoid a resource waste problem. In addition, location shifting is performed on the uplink DMRS in the slot in which there is a CSI-RS, to effectively avoid a problem of collision between the uplink DMRS and a downlink CSI-RS.

The foregoing mainly describes the solutions provided in embodiments of this application from a perspective of interaction between the first network device, the UE, and the second network device. It may be understood that to implement the foregoing functions, the first network device, the UE, and the second network device include corresponding hardware structures and/or software modules for performing the functions. A person skilled in the art should easily be aware that, in combination with network elements and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the first network device and the UE may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that, in embodiments of this application, module division is merely an example, and is merely a logical function division. In actual implementation, another division manner may be used.

Figure 8:
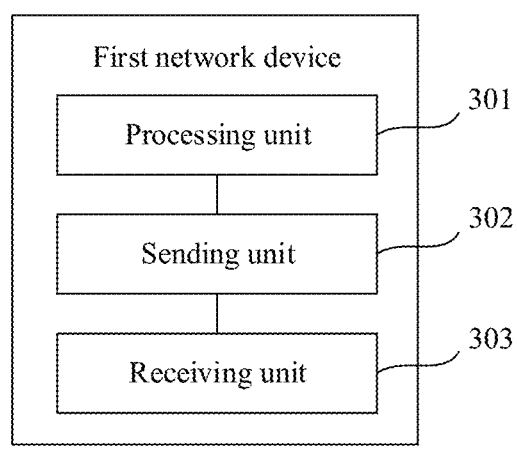
FIG. 8 is a schematic diagram of a structure of a first network device according to an embodiment of this application.

When an integrated unit is used, FIG. 8 is a possible schematic diagram of a structure of a communication apparatus according to an embodiment of this application. The apparatus may be used as a first network device or a chip built in the first network device. The apparatus includes a processing unit 301 and a sending unit 302. Further, the apparatus includes a receiving unit 303.

In a possible implementation, the processing unit 301 is configured to support the apparatus in performing S201 in the foregoing method embodiment and/or another technical process described in this specification. The sending unit 302 is configured to support the apparatus in performing S202 in the foregoing method embodiment. Further, the sending unit 302 is further configured to support the apparatus in performing S205 in the foregoing method embodiment, and the receiving unit 303 is configured to support the apparatus in performing S208 in the foregoing method embodiment. It should be noted that all related content of the steps in the foregoing method embodiments may be cited in function descriptions of corresponding functional modules. Details are not described herein again.

Based on hardware implementation, in this embodiment of this application, the processing unit 301 may be a processor of the apparatus, the sending unit 302 may be a transmitter of the apparatus, the receiving unit 303 may be a receiver of the apparatus, and the transmitter and the receiver may be generally integrated together to serve as a transceiver. A specific transceiver may also be referred to as a communication interface or an interface circuit.

Figure 9:
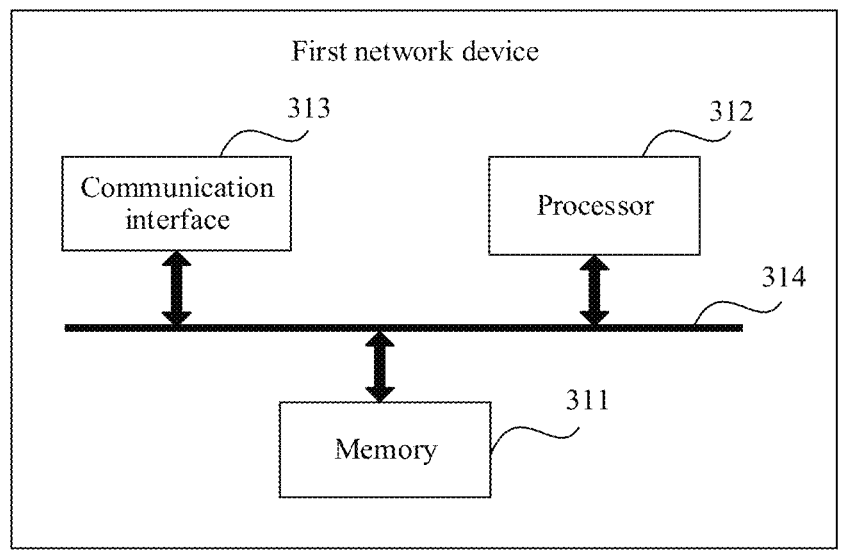
FIG. 9 is a schematic diagram of a structure of another first network device according to an embodiment of this application.

FIG. 9 is a possible schematic diagram of a structure of a communication apparatus in the foregoing embodiments according to an embodiment of this application. The apparatus may be used as a first network device or a chip built in the first network device. The apparatus includes a processor 312 and a communication interface 313. Further, the apparatus may include a memory 311 and a bus 314. The processor 312, the memory 311, and the communication interface 313 are connected by using the bus 314.

The processor 312 is configured to control and manage an action of the apparatus. In a possible implementation, the processor 312 may be configured to support the apparatus in performing S201 in the foregoing method embodiment and/or another technical process described in this specification. The communication interface 313 is configured to support the apparatus in performing communication, for example, to support the apparatus in communicating with a second network device and an UE. The memory 311 is configured to store program code and data of the apparatus.

In this application, the processor 312 may be a central processing unit, a general-purpose processor, a digital signal processor, an application-specific integrated circuit, a field programmable gate array or another programmable logic device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 314 in FIG. 9 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 9, but this does not mean that there is only one bus or only one type of bus.

Figure 10:
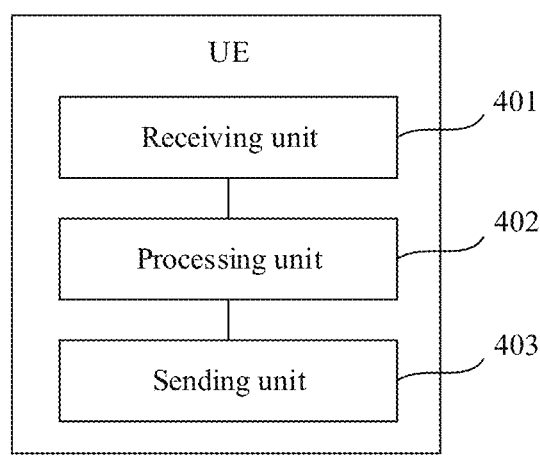
FIG. 10 is a schematic diagram of a structure of UE according to an embodiment of this application.

When an integrated unit is used, FIG. 10 is a possible schematic diagram of a structure of a communication apparatus according to an embodiment of this application. The apparatus may be used as an UE or a chip built in the UE.

The apparatus includes a receiving unit 401 and a processing unit 402. Further, the apparatus includes a sending unit 403.

In a possible implementation, the receiving unit 401 is configured to support the apparatus in performing S203 in the foregoing method embodiment. The processing unit 402 is configured to support the apparatus in performing S204 in the foregoing method embodiment and/or another technical process described in this specification. Further, the receiving unit 401 is configured to support the apparatus in performing S206 in the foregoing method embodiment. The sending unit 403 is configured to support the apparatus in performing S207 in the foregoing method embodiment. It should be noted that all related content of the steps in the foregoing method embodiments may be cited in function descriptions of corresponding functional modules. Details are not described herein again.

Based on hardware implementation, in this embodiment of this application, the processing unit 402 may be a processor of the apparatus, the receiving unit 401 may be a receiver of the apparatus, the sending unit 403 may be a transmitter of the apparatus, and the transmitter and the receiver may be generally integrated together to serve as a transceiver. A specific transceiver may also be referred to as a communication interface or an interface circuit.

Figure 11:
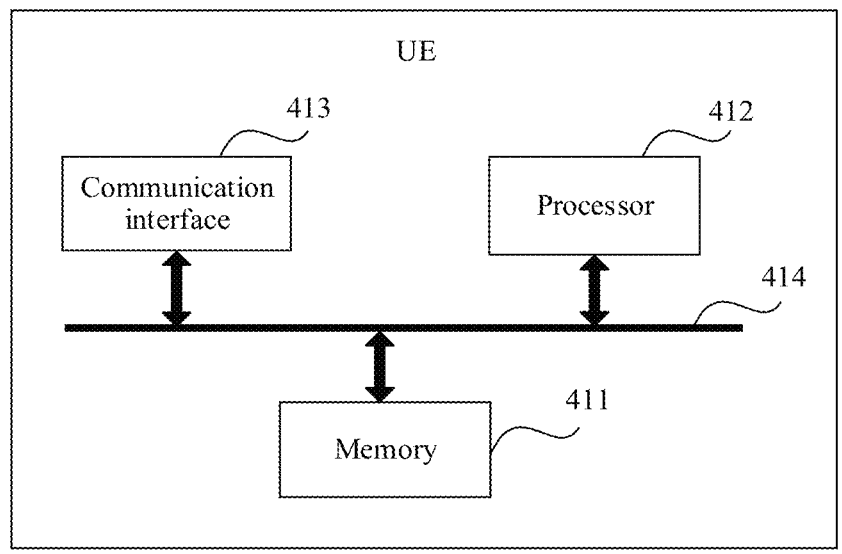
FIG. 11 is a schematic diagram of a structure of another UE according to an embodiment of this application.

FIG. 11 is a possible schematic diagram of a structure of a communication apparatus in the foregoing embodiments according to an embodiment of this application. The apparatus may be used as an UE or a chip built in the UE. The apparatus includes a processor 412 and a communication interface 413. Further, the apparatus may further include a memory 411 and a bus 414. The processor 412, the memory 411, and the communication interface 413 are connected by using the bus 414.

The processor 412 is configured to control and manage an action of the apparatus. In a possible implementation, the processor 412 may be configured to support the apparatus in performing S204 in the foregoing method embodiment and/or another technical process described in this specification. The communication interface 413 is configured to support the apparatus in performing communication, for example, to support the apparatus in communicating with a first network device. The memory 411 is configured to store program code and data of the apparatus.

In this application, the processor 412 may be a central processing unit, a general-purpose processor, a digital signal processor, an application-specific integrated circuit, a field programmable gate array or another programmable logic device, a transistor logical device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of a digital signal processor and a microprocessor. The bus 414 in FIG. 11 may be a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 11, but this does not mean that there is only one bus or only one type of bus.

Based on this, an embodiment of this application further provides a communication system. The communication system includes a first network device, a second network device, and an UE. The first network device is the communication apparatus provided in FIG. 8 or FIG. 9, and is configured to perform the steps of the first network device in the foregoing method embodiments. The UE is the communication apparatus provided in FIG. 10 or FIG. 11, and is configured to perform the steps of the UE in the foregoing method embodiments.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. The readable storage medium may include: any medium that can store program code, such as a USB flash drive, a removable hard disk, a read-only memory, a random access memory, a magnetic disk, or an optical disc. Based on such an understanding, the technical solutions of embodiments of this application essentially, or the part contributing to the conventional technology, or all or some of the technical solutions may be implemented in the form of a software product.

According to another aspect of this application, a computer-readable storage medium is provided. The computer-readable storage medium stores instructions. When the instructions are run on a device, the device is enabled to perform the steps of the first network device in the foregoing method embodiments.

According to another aspect of this application, a computer-readable storage medium is provided. The computer-readable storage medium stores instructions. When the instructions are nm on a device, the device is enabled to perform the steps of the UE in the foregoing method embodiments.

According to another aspect of this application, a computer program product is provided. When the computer program product runs on a device, the device is enabled to perform the steps of the first network device in the foregoing method embodiments.

According to another aspect of this application, a computer program product is provided. When the computer program product runs on a device, the device is enabled to perform the steps of the UE in the foregoing method embodiments.

Finally, it should be noted that the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An uplink transmission resource indication method, applied to a first network device, wherein the method comprises:
   determining a first reference signal RS resource of a second network device in a time-frequency resource, wherein the time-frequency resource comprises a plurality of time units in a time domain, the first RS resource is located in a first time unit of the plurality of time units;
   sending first configuration information to a user equipment, wherein the first configuration information is for determining an uplink transmission resource in the time-frequency resource, and the uplink transmission resource does not overlap the first RS resource; and
   sending second configuration information to the user equipment, wherein the second configuration information indicates a first location offset of an uplink demodulation reference signal DMRS, wherein a time domain symbol occupied by the uplink DMRS after the uplink DMRS is shifted by the first location offset is different from a time domain symbol occupied by the first RS resource.

2. The method according to claim 1, wherein the method further comprises:
   receiving an RS from the second network device on the first RS resource, and receiving uplink information from the user equipment on the uplink transmission resource, wherein the uplink information comprises uplink data and the uplink DMRS.

3. The method according to claim 1, wherein the first configuration information indicates the first RS resource; or the first configuration information indicates the uplink transmission resource.

4. An uplink transmission resource indication method, applied to user equipment, wherein the method comprises:
   receiving first configuration information from a first network device, wherein the first configuration information is for determining an uplink transmission resource in a time-frequency resource;
   determining the uplink transmission resource based on the first configuration information, wherein the uplink transmission resource does not overlap a first reference signal RS resource of a second network device in the time-frequency resource, the time-frequency resource comprises a plurality of time units in time domain, the first RS resource is located in a first time unit of the plurality of time units ;
   receiving second configuration information from the first network device, wherein the second configuration information indicates a first location offset, and the first location offset is a location offset of an uplink demodulation reference signal DMRS; and
   sending uplink information to the first network device on the uplink transmission resource, wherein the uplink information comprises uplink data and the uplink DMRS,
   wherein a time domain location of the uplink DMRS in the first time unit is obtained by shifting an initial time domain location of the uplink DMRS by the first location offset, the first location offset is a location offset of the uplink DMRS, and a time length of the first time unit does not exceed one slot, and wherein a time domain symbol occupied by the uplink DMRS after the uplink DMRS is shifted by the first location offset is different from a time domain symbol occupied by the first RS resource.

5. The method according to claim 4, wherein the method further comprises:
sending uplink information to the first network device on the uplink transmission resource, wherein the uplink information comprises uplink data and the uplink DMRS;
wherein when the uplink DMRS does not collide with an RS of the second network device, a time domain location of the uplink DMRS is an initial time domain location of the uplink DMRS; or
when the uplink DMRS collides with an RS, a time domain location of the uplink DMRS is obtained by shifting an initial time domain location of the uplink DMRS by the first location offset, wherein the first location offset is a location offset of the uplink DMRS;
wherein a time domain symbol occupied by the uplink DMRS after the uplink DMRS is shifted by the first location offset is different from a time domain symbol occupied by the first RS resource.

6. The method according to claim 4, wherein the first configuration information indicates the first RS resource; or the first configuration information indicates the uplink transmission resource.

7. A communication apparatus, comprising:
at least one processor; and
a memory storing programming instructions for execution by the at least one processor, the programming instructions instructing the communication apparatus to perform operations comprising:
determining a first reference signal RS resource of a second network device in a time-frequency resource, wherein the time-frequency resource comprises a plurality of time units in time domain, the first RS resource is located in a first time unit of the plurality of time units;
sending first configuration information to user equipment, wherein the first configuration information is for determining an uplink transmission resource in the time-frequency resource, and the uplink transmission resource does not overlap the first RS resource; and
sending second configuration information to the user equipment, wherein the second configuration information indicates a first location offset, and the first location offset is a location offset of an uplink demodulation reference signal DMRS, wherein a time domain symbol occupied by the uplink DMRS after the uplink DMRS is shifted by the first location offset is different from a time domain symbol occupied by the first RS resource.

8. The apparatus according to claim 7, wherein the operations further comprise:
receiving an RS from the second network device on the first RS resource, and receiving uplink information from the user equipment on the uplink transmission resource, wherein the uplink information comprises uplink data and the uplink DMRS.

9. The apparatus according to claim 7, wherein the first configuration information indicates the first RS resource; or the first configuration information indicates the uplink transmission resource.

10. A communication apparatus, comprising:
at least one processor; and
a memory storing programming instructions for execution by the at least one processor, the programming instructions instructing the communication apparatus to perform operations comprising:
receiving first configuration information from a first network device, wherein the first configuration information is for determining an uplink transmission resource in a time-frequency resource;
determining the uplink transmission resource based on the first configuration information, wherein the uplink transmission resource does not overlap a first reference signal RS resource of a second network device in the time-frequency resource, the time-frequency resource comprises a plurality of time units in time domain, the first RS resource is located in a first time unit of the plurality of time units;
receiving second configuration information from the first network device, wherein the second configuration information indicates a first location offset, and the first location offset is a location offset of an uplink demodulation reference signal DMRS; and
sending uplink information to the first network device on the uplink transmission resource, wherein the uplink information comprises uplink data and the uplink DMRS,
wherein a time domain location of the uplink DMRS in the first time unit is obtained by shifting an initial time domain location of the uplink DMRS by the first location offset, the first location offset is a location offset of the uplink DMRS, and a time length of the first time unit does not exceed one slot;
wherein a time domain symbol occupied by the uplink DMRS after the uplink DMRS is shifted by the first location offset is different from a time domain symbol occupied by the first RS resource.

11. The apparatus according to claim 10, wherein the programming instructions further instruct the communication apparatus to additionally perform:
sending uplink information to the first network device on the uplink transmission resource, wherein the uplink information comprises uplink data and the uplink DMRS;
wherein when the uplink DMRS does not collide with an RS of the second network device, a time domain location of the uplink DMRS is an initial time domain location of the uplink DMRS; or
when the uplink DMRS collides with an RS, a time domain location of the uplink DMRS is obtained by shifting an initial time domain location of the uplink DMRS by the first location offset, wherein the first location offset is a location offset of the uplink DMRS, wherein a time domain symbol occupied by the uplink DMRS after the uplink DMRS is shifted by the first location offset is different from a time domain symbol occupied by the first RS resource.

12. The apparatus according to claim 10, wherein the first configuration information indicates the first RS resource; or the first configuration information indicates the uplink transmission resource.

13. The uplink transmission resource indication method according to claim 1, wherein the first configuration information is carried in a higher layer signaling.

14. The uplink transmission resource indication method according to claim 13, wherein the higher layer signaling is RRC signaling.

15. The uplink transmission resource indication method according to claim 4, wherein the first configuration information is carried in a higher layer signaling.

16. The uplink transmission resource indication method according to claim 15, wherein the higher layer signaling is RRC signaling.

17. The communication apparatus according to claim 7, wherein the first configuration information is carried in a higher layer signaling.

18. The communication apparatus according to claim 17, wherein the higher layer signaling is RRC signaling.

19. The communication apparatus according to claim 10, wherein the first configuration information is carried in a higher layer signaling.

20. The communication apparatus according to claim 19, wherein the higher layer signaling is RRC signaling.

\* \* \* \* \*